United States Patent [19]

Williams et al.

[11] 4,449,925

[45] May 22, 1984

[54] HEATING DEVICE AND METHOD OF HEATING ARTICLES

[76] Inventors: Alan E. Williams, 9 Willes Rd., Leamington Spa, Warwickshire; Andrew R. Gibbs, 19, Bishops Rd., Sutton Coldfield, West Midlands, both of England

[21] Appl. No.: 353,366

[22] Filed: Mar. 1, 1982

Related U.S. Application Data

[63] Continuation of Ser. No. 147,066, May 6, 1980, abandoned.

[30] Foreign Application Priority Data

May 12, 1979 [GB] United Kingdom ............. 7916545
Feb. 2, 1980 [GB] United Kingdom ............. 8003582

[51] Int. Cl.³ .............................................. F24J 3/00
[52] U.S. Cl. .................................. 432/225; 432/226; 126/413; 269/296; 269/294
[58] Field of Search ............... 432/224, 225, 226, 231, 432/232; 126/408, 409, 413; 269/294, 296, 87.3, 87

[56] References Cited

U.S. PATENT DOCUMENTS

| | | | |
|---|---|---|---|
| 686,758 | 11/1901 | Patterson | 432/231 |
| 1,528,046 | 3/1925 | Butts | 126/413 |
| 2,185,322 | 1/1940 | Anderson | 269/296 |
| 2,699,601 | 1/1955 | Darnell | 269/296 |
| 2,733,740 | 2/1956 | Little | 269/296 |
| 2,847,988 | 8/1958 | Hess | 126/39 |
| 2,934,337 | 4/1960 | Cottingham | 269/296 |
| 3,310,047 | 3/1967 | Budden | 126/92 |
| 3,312,269 | 4/1967 | Johnson | 158/99 |
| 3,319,948 | 5/1967 | Olsen | 432/226 |
| 3,334,879 | 8/1967 | Nordling | 432/226 |
| 3,396,455 | 8/1968 | Sherlock | 29/498 |
| 3,588,301 | 6/1971 | Brennemen et al. | 431/348 |
| 3,679,189 | 7/1972 | Deal et al. | 432/226 |
| 3,816,065 | 6/1974 | Marietta | 432/225 |
| 3,833,338 | 9/1974 | Badrock | 432/225 |
| 3,930,790 | 1/1976 | Rogosch | 432/229 |

FOREIGN PATENT DOCUMENTS

| | | |
|---|---|---|
| 1115006 | 10/1961 | Fed. Rep. of Germany . |
| 2918497 | 9/1980 | Fed. Rep. of Germany . |
| 1136330 | 5/1957 | France . |
| 2136112 | 12/1972 | France . |
| 2332910 | 6/1977 | France . |
| 2353793 | 12/1977 | France . |
| 212070 | 3/1924 | United Kingdom . |
| 216510 | 7/1924 | United Kingdom . |
| 272201 | 9/1926 | United Kingdom . |
| 263539 | 12/1926 | United Kingdom . |
| 579227 | 7/1946 | United Kingdom . |
| 1110883 | 12/1968 | United Kingdom . |

*Primary Examiner*—Henry C. Yuen

[57] ABSTRACT

A device for heating an article, especially a heat recoverable article, by means of a gas heating tool comprises an element which is preferably hollow and is heated by a flame from the tool, means for positioning the article within the element and a support for retaining the element on the heating tool. In use, a flame from the tool is directed on to the element and the article is heated over a major part of its surface by radiant heat emitted by the element.

2 Claims, 5 Drawing Figures

HEATING DEVICE AND METHOD OF HEATING ARTICLES

This is a continuation of application Ser. No. 147,066 filed May 6, 1980 now abandoned.

This invention relates to devices for heating articles, especially heat-recoverable articles and to the use of such devices.

Heat-recoverable articles are widely used in many fields, for example as insulating, protective sleeves or end-seals for electrical cable ends, connections or branches, for example as described in UK Pat. Specification Nos. 1,062,043, 1,098,304 and 1,116,878 the disclosures of which are incorporated herein by reference. By a heat-recoverable article is herein meant an article which has been deformed from an original form in which it is dimensionally stable to the action of heat (apart from its normal thermal expansion) to a form in which it is dimensionally unstable to heat. Such an article will, when heated to a certain temperature known as the recovery temperature, recover or attempt to recover, to its original dimensionally stable form. Heat-recoverable articles are typically made from a polymer such as an olefinic polymer, for example polyethylene or ethylene copolymers with propylene, butene, vinyl acetate or ethyl acrylate; polyvinyl chloride or polyvinylidine fluoride which has been cross-linked, for example by irradiation with high energy electrons or $\gamma$-radiation or has been chemically cross-linked.

In order to insulate an end, branch or connection in an electrical cable, the heat-recoverable article in the desired shape, for example a sleeve, transition, udder or boot, is positioned over the end, branch or connection and is heated for a short period of time to a temperature in the range of from about 120° to 400° C., whereupon the article shrinks and forms a closely fitting cover around the cable. The heat-recoverable article may be heated by means of a hot-air gun which blows air, usually at a temperature of up to 500° C., over the article or by means of an infra-red heater in which infra-red radiation is generated by a hot filament. By the nature of the operation, however, it is often not possible to use a hot-air gun or infra-red heater to heat the articles since it may be necessary to form a branch or connection in sites remote from any electrical power supply, or before any power supply has been installed. In such cases it is necessary to use an alternative form of heating device such as a gas torch powered by propane or butane gas.

Gas torches, however, have the disadvantage that it is difficult to ensure that the article is heated uniformly over its surface area and that consequently the quality of the completed branch or connection is dependent to a large extent on the skill of the operator.

The use of hot-air guns or gas torches has a further disadvantage in that the surface of the heat-recoverable article is heated initially and the rate of heating of inner parts of the article including any fusible insert that may be present is dependent on the thermal conductivity of the heat-recoverable material which is usually relatively low. There is, therefore, a danger of overheating the surface of the heat-recoverable article before the fusible insert has properly melted.

The present invention provides a device suitable for heating an article with a gas heating tool, preferably a portable heating tool, which comprises an element arranged to be heated by a flame from the tool and so shaped as to radiate thermal energy on to at least a major part of the surface of the article, means for positioning the article with respect to the element to receive radiant thermal energy from the element, and a support for retaining the element in a position relative to the tool so that, in use, at least a major portion of the flame is directed onto the element and not onto the article.

Preferably at least part of the element is curved and the means for positioning the article is arranged so that, in use, the element surrounds at least a major part of the article, and preferably surrounds the entire article.

The element may have a hollow, substantially tubular, shape and is advantageously open-ended at each end. The element may have any desired transverse profile. In one preferred embodiment for example, the element is in the form of an open-ended right circular cylinder. The element may be continuous over its circumference or it may have a slot extending axially from one end to the other for inserting the article. The latter form of device is particularly suitable for use with elongate articles such as cables where the ends of the articles are not accessible or, if accessible, where it is undesirable to disconnect or otherwise displace them from their original position. It is also possible to locate the slot in such a position in the element that it allows the operator to view the article while it is being heated.

In another embodiment, the element is so shaped that, in use, it guides the flame and/or hot gases caused by combustion around at least a major part of the article. This form of element has the advantage that a major part of the element that radiates heat onto the article is heated directly by the flame and/or hot combustion gases, so that it is not necessary for large parts of the element to be heated solely by conduction of heat from other parts of the element. The element advantageously comprises two walls for guiding the flame and/or hot combustion gases around the article, one wall having one surface arranged to be heated by the flame and/or hot combustion gases and an oppositely facing surface arranged to radiate thermal energy onto the article, and the other wall having a surface arranged both to be heated by the flame and/or hot combustion gases and to radiate thermal energy onto the article. The walls need not be directly connected to each other although it is preferred that they are connected, for example by two side walls to form a hollow tubular region through which the flame passes. This has the advantage that the flame is enclosed in a defined space thereby reducing the possibility of the flame accidentally touching the article to be heated.

The means for positioning the article preferably comprises a pair of arms, each arm having a recess for locating the article and extending to a position adjacent to one of the open ends of the element so that an elongate article such as a cable can be positioned within the element and, if the element has any curved portions of circular or port circular profile, preferably so that the article is coaxial with the curved portions. Preferably the article is positioned so that it does not touch the sides of the element. Advantageously the support for the heatable element also provides a support for the means for locating the article. Such an arrangement has the advantage that the device can be detached from the tool in one piece.

According to another aspect of the invention there is provided a tool for heating an article which comprises a gas burner, an element arranged to be heated by a flame from the burner and so shaped as to radiate thermal energy onto at least a major part of the surface of the article, and means for positioning the article with respect to the element to receive radiant thermal energy therefrom, the element being retained in a position relative to the tool so that, in use, at least a portion of the flame is directed onto the element and not onto the article. Preferably the element is as described above with reference to the device of the invention.

Although the element can, in principle, be made from any material that is capable of withstanding temperatures in the order of about 800° C., such as a ceramic, it is preferable that the material from which it is made has a high thermal conductivity so that the temperature differences between different regions of the element are as small as possible. For this reason the element is usually made from a metal, and preferably from copper or a ferrous alloy, e.g. stainless steel. Although the element is preferably made from metal in the form of a sheet or tube since the element is then more robust, this is not essential, and the element may, in some cases, for formed for example from metal braid or gauze.

The device according to the invention may be used to heat any small article to temperatures of up to about 600° C. and is especially useful for heating heat-recoverable articles such as sleeves, end-seals, udders, boots and transitions for electrical cable. Accordingly, the present invention also provides a method of heating an article, which comprises directing a flame from a gas heating tool onto an element that is so shaped as to radiate thermal energy onto at least a major part of the surface of the article and positioning the article with respect to the element so that the article receives radiant thermal energy from the element and is shielded by the element over at least a major part of its surface from direct contact with the flame.

Where the article is heated using the device according to the invention, the device is attached to a butane or propane gas torch and the element is heated. The sleeve or other article is simply positioned over the part of the cable to be covered, positioned within the element and retained in that position for a short period of time, for example up to 30 seconds, before being removed. Often the article will contain a fusible insert of thermoplastic material for sealing the article to the cable, and/or a quantity of solder, and it is essential that the fusible insert and/or solder is heated sufficiently to melt without the outer part of the article being overheated. It has been found that the use of a preferred device according to the invention promotes melting of the fusible insert and/or solder since part of the heat that the article receives will be in the form of infra-red radiation, and the degree of heating of the fusible insert of solder is not so affected by the poor thermal conductivity of the outer part of the article. For this reason it is advantageous for the fusible insert to have a greater infra-red absorption than that of the outer parts of the article.

Therefore, dimensionally heat-recoverable articles may be applied to a substrate by a preferred method according to the invention which comprises positioning the article on the substrate and heating the article at least partly by infra-red radiation from an element until the article has recovered sufficiently to grip the substrate, wherein the element is heated by a flame from a gas heating tool and is so shaped as to radiate thermal energy onto at least a major part of the surface of the article, the element being retained in a position relative to the tool and the article being positioned with respect to the element, so that at least a major portion of the flame is directed onto the element and not onto the article.

Where articles such as end seals, splices, connections and the like have to be fitted onto cables that have already been installed, it has hitherto often been necessary to rotate the heating tool about the article in order to heat the article uniformly over its surface, which can present considerable difficulty where the article is located in a confined space. In view of the fact that a more uniform heating effect can be achieved by the device according to the invention without rotation of the device about the article, heating of articles in confined spaces can be greatly simplified and can be performed with less risk of accidental damage to adjacent cables and property.

In view of the fact that the device according to the invention can be used in sites where no electrical power is available and that the infra-red radiation promotes heating of the inner parts of the article such as fusible inserts, the device is most suitable for heating splices and end seals for example for heat tracing cables, and particularly for heating end-seals for mineral insulated cables such as the end-seals described in UK Specification Pat. No. 1,098,304 the disclosure of which is incorporated herein by reference. The heating effect of the device increases the likelihood of the adhesive fusible insert melting correctly (this occurring typically at about 140° C.) so providing a good seal that prevents water from leaking into the end-seal and prevents air from being trapped at the cable face.

It is possible to provide the device with a shield to protect the flame from the heating tool against wind. The shield preferably extends from the tool or support to the element and may be formed from a sheet of metal that is curved around the device substantially to enclose the region between the burner and element. The provision of a shield makes it possible to construct a device that can be used even in strong winds where it would be difficult to heat the articles directly by a flame since, when using the device according to the invention, a heating effect will still be obtained by the infra-red radiation from the element. A further advantage of providing a shield is that, depending on the shape of the shield, it can contain the flame in the region between the heating tool and the element and so prevent the flame from inadvertently contacting any flammable material that may be in the vicinity of the device.

Two forms of device according to the present invention will now be described by way of example with reference to the accompanying drawings in which.

Figure 1:
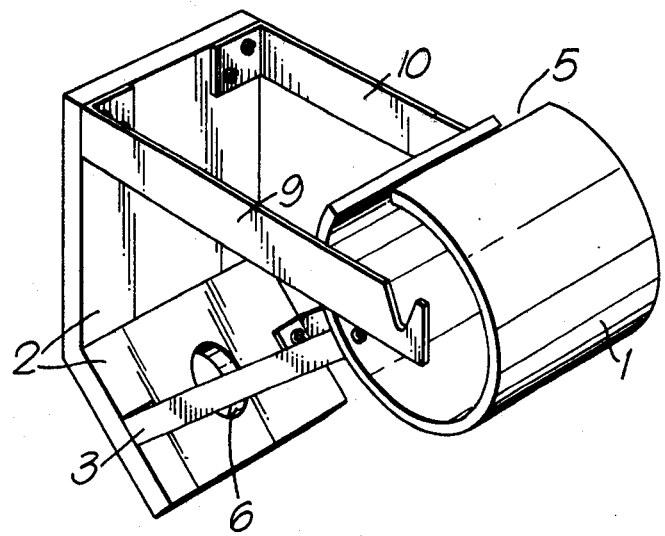
FIG. 1 is an isometric view showing one form of the device according to the invention.
Figure 2:
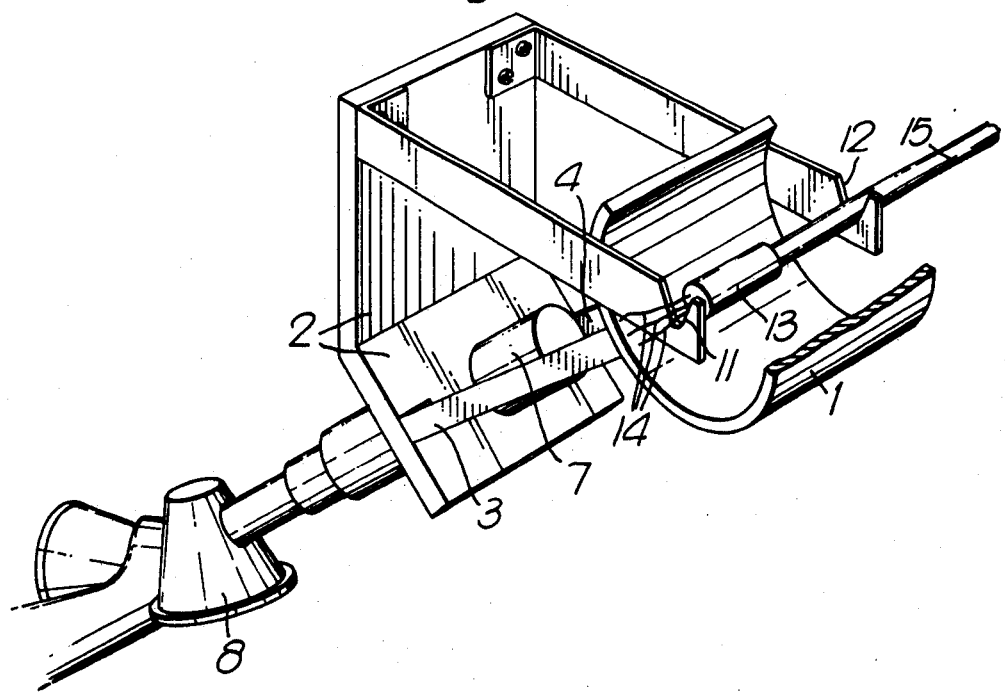
FIG. 2 is a partly cut-away view showing the device shown in FIG. 1 together with a gas torch and an article to be heated.

Referring to the accompanying drawings, a device for heating an article with a gas heating tool comprises an open-ended hollow substantially cylindrical copper or stainless steel element 1 which is attached to a support 2 by means of two support bars 3, 4.

The element should be small enough to provide a sufficient heating effect on the article to be heated by not too small since there would then be a risk of the article accidentally touching the element. There should usually be from 10 to 20 mm clearance between the article and the element, and so where small articles are to be heated a diameter of about 40 mm is preferred.

The element has a slot 5 through which an article to the heater may be introduced and through which the operator may observe the article during heating. The slot 5 should be sufficiently wide to allow an article to be introduced into the element 1 and subsequently removed without the risk of it accidentally touching the element, but should not be so wide that sufficient heating of the part of the article facing the slit is prevented.

The support 2 has an aperture 6 for receiving a gas heating tool, in this case a burner 7 of a propane or butane gas torch 8. The position of the element 1 relative to the support 2 and the position of the aperture in the support are such that a flame from the burner 7 is directed toward the element and that the part of the element facing the burner acts as a shield to protect the article from the flame. Two arms 9, 10 are attached to the support 2, and extend either side of the element 1. Each arm has a notch or recess 11, 12 along the axis of the element 1 so that the article to be heated can be positioned at the centre of the element.

Figure 3:
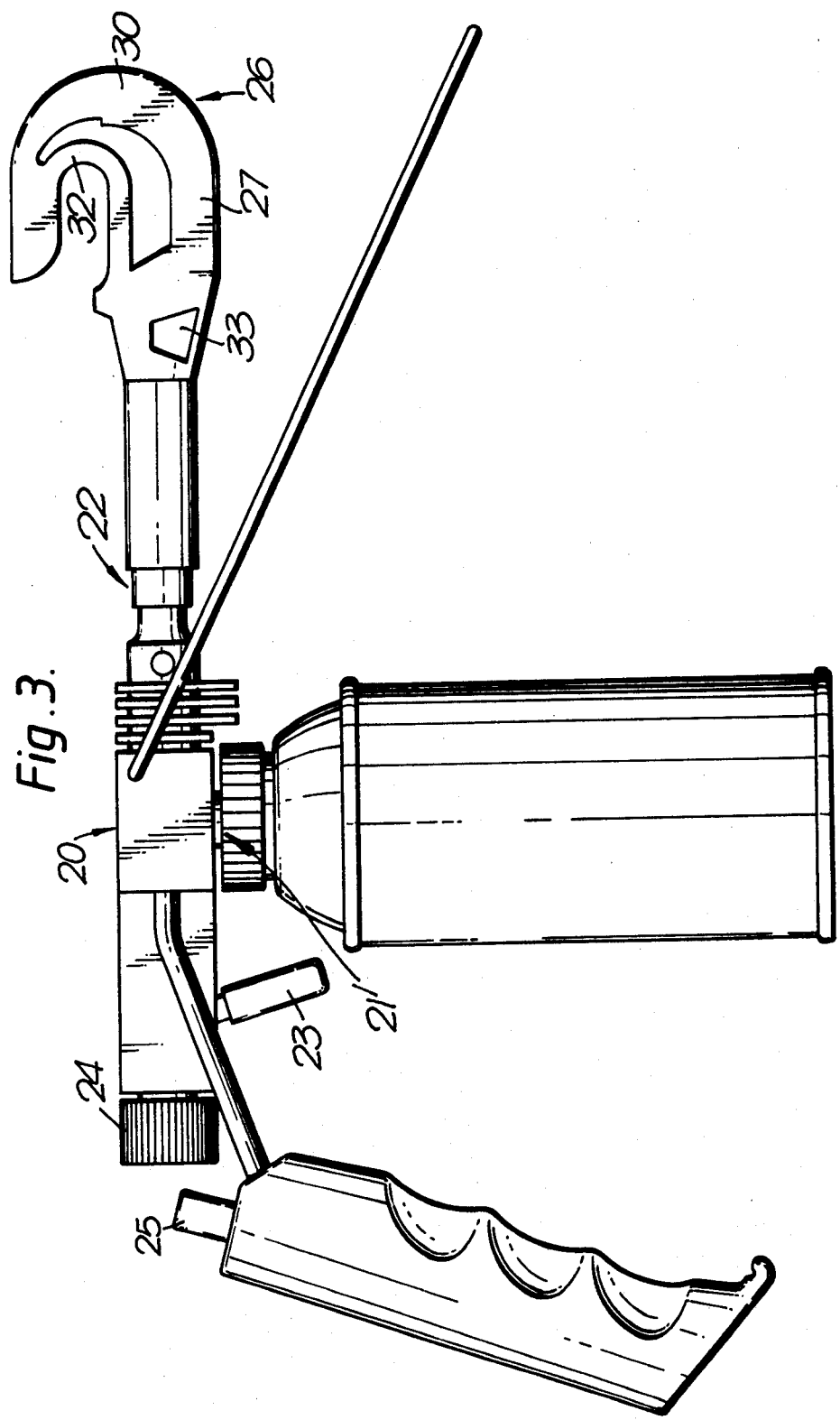
FIG. 3 is a side elevation of a second form device according to the invention and associated heating tool.

FIG. 3 shows a heating tool which comprises a body 20 having a gas inlet 21' adapted to receive gas from a gas bottle or cartridge, and a valve (not shown) for regulating the supply of gas to a burner 22, the valve being controlled by means of a trigger 23 and a valve stop 24. The gas may be ignited in known manner by means of a piezo-electric igniter actuated by a thumb button 25.

Figure 4:
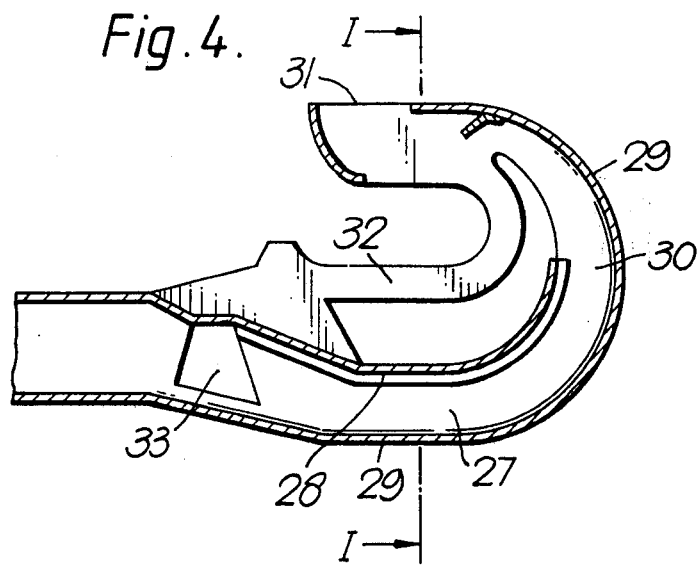
FIG. 4 is a sectional elevation of the heating element of the device as shown in FIG. 1.
Figure 5:
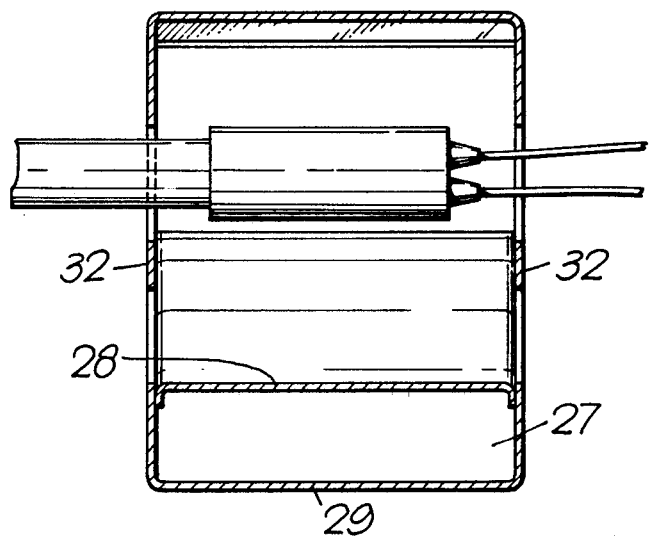
FIG. 5 is a sectional elevation along the line I—I of FIG. 4, with an article to be heated in position.

The heating tool is provided with a device according to the invention (also shown in FIGS. 4 and 5) comprising an element 26 having a hollow tubular portion 27 formed between two walls 28 and 29. The element 26 guides the flame and/or hot gases formed by combustion through the tubular portion 27, and along a curved portion 30 before they leave via aperture 31. Wall 28 has one surface forming part of the interior surface of the tubular portion 27 which is arranged to be heated by the flame, and a surface opposite thereto which faces the article and which, when the tool is ignited, radiates thermal energy onto the article. Wall 29 has a surface, part of which also forms part of the interior surface of the tubular portion 27, which is arranged both to be heated by the flame and/or hot combustion gases and to radiate thermal energy onto the article. Each side of the element has a flange or raised member 32 for positioning an article with respect to the element so that it receives radiant energy over a major portion of its surface and cannot approach the heated parts of the element too closely.

The device may be formed integrally with the burner of the heating tool or it may be detachably mounted thereon by means of a screw thread or clamp. The element is preferably formed from a metal having a high thermal conductivity such as copper or a ferrous alloy, especially stainless steel.

The element may also be provided with apertures 33 or a recess so that an article may be positioned with the flame. If the tool is to be use for recovering heat recoverable end seals on to mineral insulated cables, the end of the cable may be placed within the apertures 33 for a few seconds before the end seal is placed over it so that the sheath of the cable becomes warm and facilitates melting of the fusible insert of the cable.

We claim:

1. A device suitable for heating an article with a gas heating tool, which integrally comprises:
    (a) an element in the form of a hollow, substantially tubular right circular cylinder that is open at each end and that is arranged to be heated by a flame from the tool and to radiate thermal energy onto at least a major part of the surface of the article;
    (b) means for receiving the gas heating tool oriented so that a flame from the tool heats the element,
    (c) locating means for locating the article in a position spaced apart from the element where at least part of the element is curved around the position in which the article is located, said locating means preventing the article from touching the element, in which spaced apart position the article receives radiant thermal energy from the element, and
    (d) means for retaining the element in a position between the article and the tool to receive at least a major portion of the flame and to shield the article from the flame,
    wherein the element has a slot extending from one end to the other to allow the article to be located within the element.

2. A tool for heating an article which integrally comprises:
    (a) means for holding a gas burner,
    (b) an element in the form of a hollow substantially tubular right circular cylinder that is open at each end and that is arranged to be heated by a flame from the burner and to radiate thermal energy onto at least a major part of the surface of the article,
    (c) means for locating the article in a position spaced apart from the element where at least part of the element is curved around the position in which the article is located, said locating means preventing the article from touching the element, in which spaced apart position the article receives radiant thermal energy from the element, and
    (d) means for retaining the element in a position between the article and the tool to receive at least a major portion of the flame and to shield the article from the flame,
    wherein the element has a slot extending axially from one end to the other to allow the article to be located within the element.

* * * * *